US010447408B2

(12) United States Patent
Lucamarini et al.

(10) Patent No.: US 10,447,408 B2
(45) Date of Patent: Oct. 15, 2019

(54) MULTI-TRANSMITTER QUANTUM OPTICAL COMMUNICATION SYSTEM AND METHOD

(71) Applicant: KABUSHIKI KAISHA TOSHIBA, Tokyo (JP)

(72) Inventors: Marco Lucamarini, Cambridge (GB); Bernd Matthias Frohlich, Cambridge (GB); James Dynes, Cambridge (GB); Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 201 days.

(21) Appl. No.: 15/408,698

(22) Filed: Jan. 18, 2017

(65) Prior Publication Data

US 2017/0222731 A1 Aug. 3, 2017

(30) Foreign Application Priority Data

Jan. 20, 2016 (GB) .................................. 1601078.7

(51) Int. Cl.
*H04B 10/70* (2013.01)
*H04B 10/85* (2013.01)
(Continued)

(52) U.S. Cl.
CPC ............. *H04B 10/85* (2013.01); *H04B 10/70* (2013.01); *H04L 9/0852* (2013.01);
(Continued)

(58) Field of Classification Search
CPC ..................................................... H04B 10/70
See application file for complete search history.

(56) References Cited

U.S. PATENT DOCUMENTS

| 2005/0281561 | A1* | 12/2005 | Tomaru | .................. | H04B 10/70 398/161 |
| 2007/0116286 | A1* | 5/2007 | Yuan | ..................... | H04B 10/70 380/256 |

(Continued)

FOREIGN PATENT DOCUMENTS

| WO | WO 2014/042822 A2 | 3/2014 |
| WO | WO 2014/115118 A2 | 7/2014 |

OTHER PUBLICATIONS

Lo et al., "Measurement-Device-Independent Quantum Key Distribution," Physical Review Letters (Mar. 30, 2012), 108:130503-1-130503-5.

(Continued)

*Primary Examiner* — Nathan M Cors
(74) *Attorney, Agent, or Firm* — Finnegan, Henderson, Farabow, Garrett & Dunner, L.L.P.

(57) ABSTRACT

A communication system comprising n transmitters and a receiver, where n is an integer of at least 2, each of said n transmitters comprising a light source and an encoder such that each transmitter is adapted to output an encoded pulse of light, said receiver comprising a first element, the system further comprising a timing circuit, the timing circuit being configured to synchronize the encoded pulses output by the transmitters such that interference between a light pulse sent from the first transmitter and a light pulse from the second transmitter, interfere at the first element, each transmitter further comprising a suppressing element adapted to stop light exiting one of the transmitters such that the system is switchable between a first operation mode where two transmitters output encoded pulses and where both pulses interfere at the interference element and a second mode of operation where just one transmitter transmits light pulses to (Continued)

said receiver, the suppressing element being controlled to stop light exiting the other transmitter.

14 Claims, 9 Drawing Sheets

(51) Int. Cl.
  *H04L 9/08* (2006.01)
  *H04L 29/06* (2006.01)
  *H03K 5/13* (2014.01)

(52) U.S. Cl.
  CPC .......... *H04L 9/0855* (2013.01); *H04L 9/0858* (2013.01); *H04L 63/06* (2013.01); *H04L 63/1475* (2013.01); *H03K 5/13* (2013.01)

(56) References Cited

U.S. PATENT DOCUMENTS

| | | | | |
|---|---|---|---|---|
| 2015/0055961 A1* | 2/2015 | Meyers | ............... | B82Y 10/00 398/140 |
| 2015/0365230 A1* | 12/2015 | Bovino | ............... | H04L 9/0852 380/256 |
| 2016/0047643 A1* | 2/2016 | Yuan | ............... | H04B 10/70 398/25 |

OTHER PUBLICATIONS

Qi et al., "Free-space reconfigurable quantum key distribution network," arXiv:1510.0489v1 (Oct. 16, 2015), pp. 1-6.
Fröhlich et al., "A quantum access network," Nature (Sep. 5, 2013), 501:69-73.
Tang et al., "Measurement-device-independent quantum key distribution over untrustful metropolitan network," arXiv:1509.08389v2 (Sep. 30, 2005), pp. 1-17.
Gottesman et al., "Quantum Digital Signatures," arXiv:quant-ph/0105032v2 (Nov. 15, 2001), pp. 1-8.
Combined Search and Examination Report issued by the GB Intellectual Property Office dated Sep. 9, 2016, for GB 1601078.7.
Qi et al., "Free-space reconfigurable quantum key distribution network," IEEE International Conference on Space Optical Systems and Applications (2015), pp. 1-6.

* cited by examiner

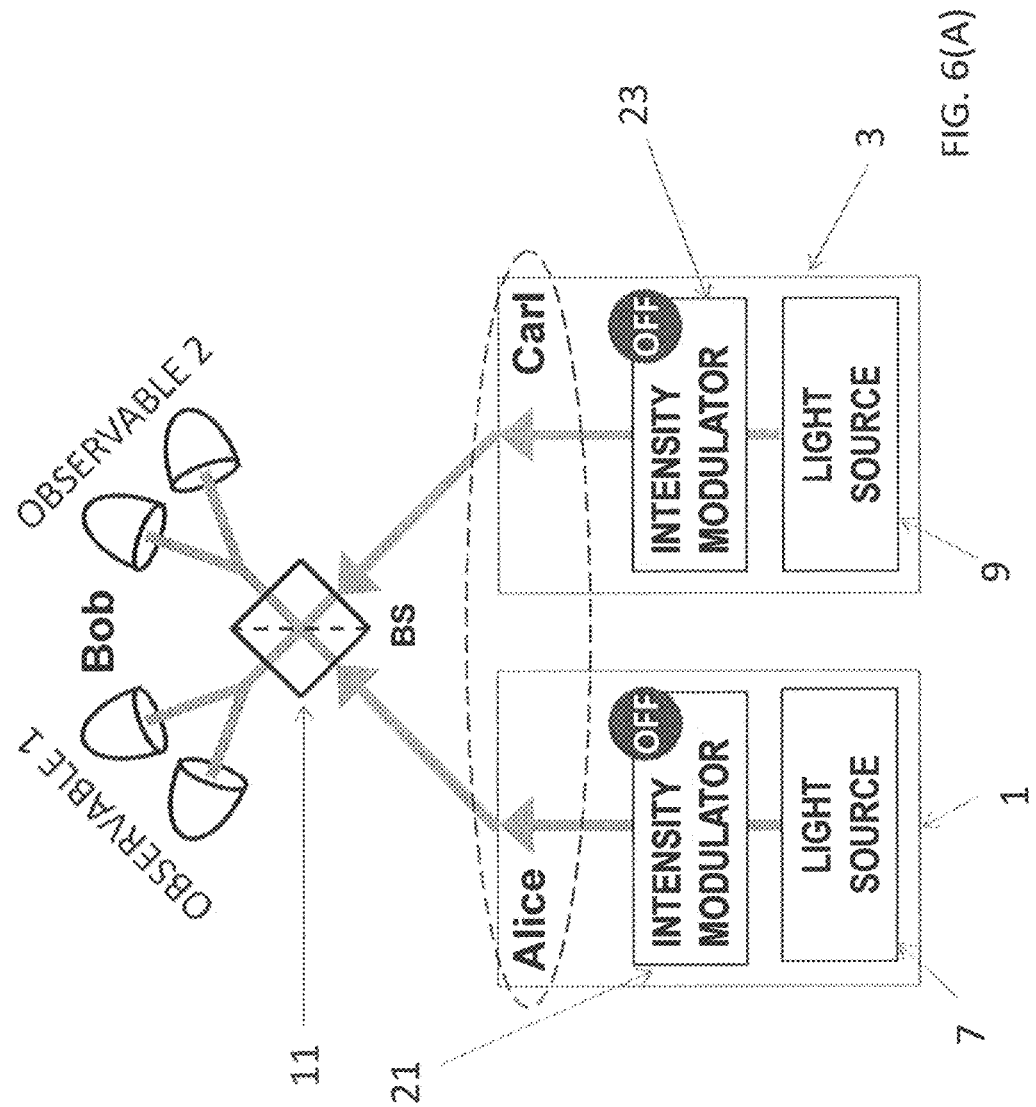

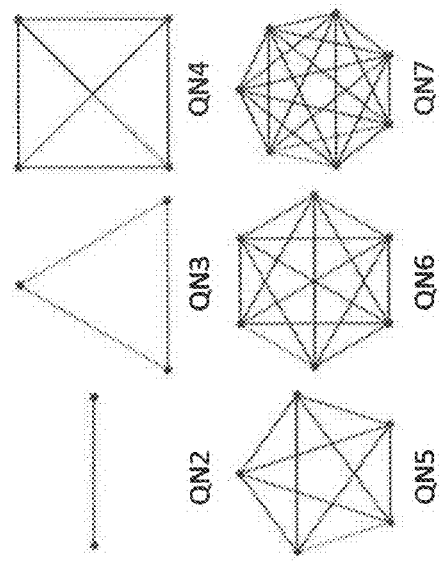
FIG. 10(A) FIG. 10(B) FIG. 10(C)
FIG. 10(D) FIG. 10(E) FIG. 10(F)
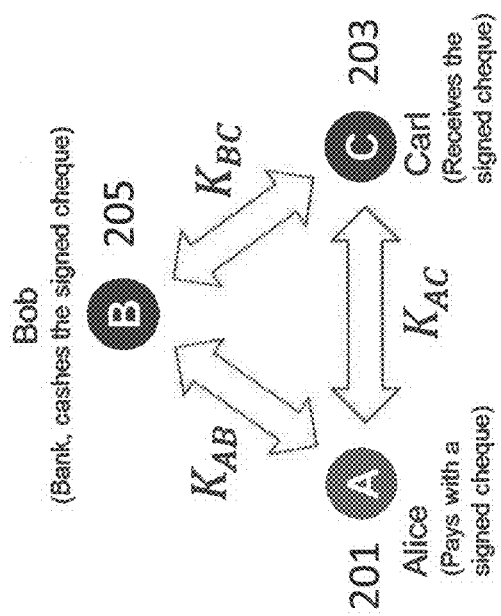
FIG. 9

MULTI-TRANSMITTER QUANTUM OPTICAL COMMUNICATION SYSTEM AND METHOD

FIELD

Embodiments described herein relate generally to communication systems and networks.

BACKGROUND

In a quantum communication system, information is sent between a transmitter and a receiver by encoded single quanta, such as single photons. Each photon carries one bit of information encoded upon a property of the photon, such as its polarization, phase or energy/time. The photon may even carry more than one bit of information, for example, by using properties such as angular momentum.

Quantum key distribution (QKD) is a technique which results in the sharing of cryptographic keys between two parties: a transmitter often referred to as "Alice"; and a receiver often referred to as "Bob". The attraction of this technique is that it allows to quantify the maximum information potentially known to an unauthorised eavesdropper, often referred to as "Eve". In many forms of QKD, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine the potential information gained by Eve.

Measurement device independent QKD, MDI-QKD has also been developed for the situation where the security of the measurement devices (Bob) might be in doubt. In MDI-QKD, two senders, usually Alice and Carl, send quanta to Bob. Alice and Carl can distil a secret key from the publicly announced measurements that have been made by Bob.

BRIEF DESCRIPTION OF THE FIGURES

Devices and methods in accordance with non-limiting embodiments will now be described with reference to the accompanying figures in which:

FIG. 6(A) is a schematic of a communication system in accordance with an embodiment of the present invention configured to implement both QKD and MDI-QKD; configured for MDI-QKD between Alice and Carl.

FIG. 9 is a schematic showing digital signature transfer in a 3 node network;

FIG. 10(A) is a schematic of a 2 node quantum network using QKD, FIG. 10(B) is a schematic of a 3 node quantum network using QKD, FIG. 10(C) is a schematic of a 4 node quantum network using QKD, FIG. 10(D) is a schematic of a 5 node quantum network using QKD, FIG. 10(E) is a schematic of a 6 node quantum network using QKD, and FIG. 10(F) is a schematic of a 7 node quantum network using QKD;

DETAILED DESCRIPTION

Figure 1:
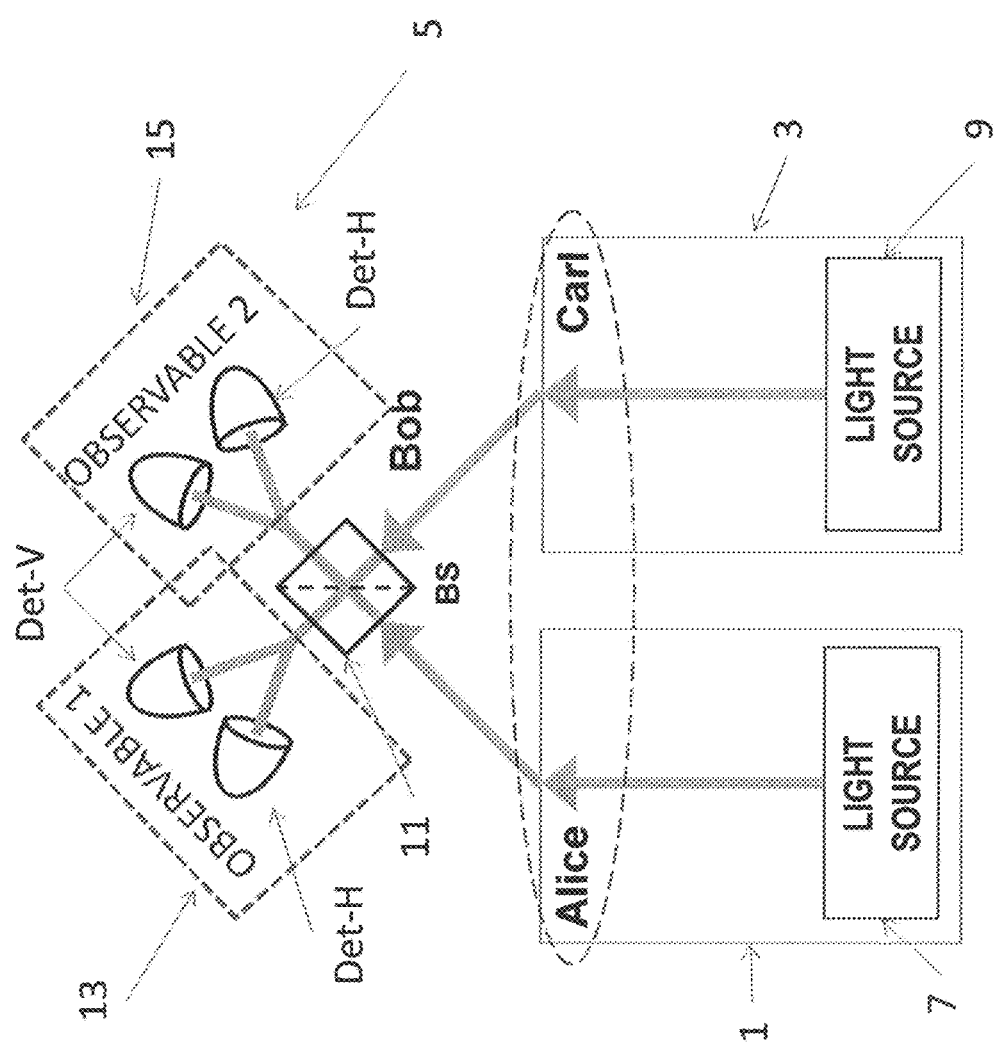
FIG. 1 is a schematic of a communication system that can implement MDI-QKD.

According to one embodiment, there is provided a communication system comprising n transmitters and a receiver, where n is an integer of at least 2, each of said n transmitters comprising a light source and an encoder such that each transmitter is adapted to output an encoded pulse of light, said receiver comprising a first element, the system further comprising a timing circuit, the timing circuit being configured to synchronise the encoded pulses output by the transmitters such that interference between a light pulse sent from the first transmitter and a light pulse from the second transmitter, interfere at the first element, each transmitter further comprising a suppressing element adapted to stop light exiting one of the transmitters such that the system is switchable between a first operation mode where two transmitters output encoded pulses and where both pulses interfere at the interference element and a second mode of operation where just one transmitter transmits light pulses to said receiver, the suppressing element being controlled to stop light exiting the other transmitter.

The suppressing element may be an attenuator that is configured to attenuate the output or an electrical circuit that is configured to switch off the light source.

In an embodiment, where the suppressing element attenuates the pulses, it is capable of selectively blocking a single pulse emitted by the transmitters, not only "group of pulses". In other words, it should work at the same repetition rate as the system.

In the above system, the first operation more can be a so-called MDI-QKD operation mode and the second operation mode a QKD operation mode. The first operation mode allows a key to be shared between the two transmitters; the QKD allows a key to be shared between a transmitter and the receiver.

In one embodiment, receiver further comprises first and second sensors, said sensors being provided such that light pulses are directed from the first element into the sensors, the sensors comprising a decoder capable of making a measurement of a light pulse using a measurement basis, wherein the measurement basis used in the first sensor is different to the measurement basis used in the second sensor.

The sensors comprise detectors, the detectors are adapted to be capable of measuring to the accuracy of a single photon, for example, the detectors may be avalanche photodiodes (APDs).

For QKD, the receiver is adapted to perform a measurement of complementary observables. For MDI-QKD, this is not necessary, instead there is a measurement of a Bell state, the receiver registers a detection of a Bell state if two detectors measuring using the same basis detect the pulse.

The above arrangement can be used to implement QKD and MDI-QKD while keeping the measurement basis fixed for both sensors. MDI-QKD is implemented if two detectors measuring in the same basis register the detection of a pulse. QKD is implemented if just one detection event is registered. The measurement basis is dependent on the sensor which received the single pulse. The interference element can direct the single pulse to either of the sensors.

In a further embodiment, a switching element is provided so that the measurement basis used in the first sensor can be switched between being the same or different to the measurement basis used in the second sensor.

This allows MDI-QKD to be performed with both detectors using the same measuring basis.

The switching between the two modes of operation can occur such that one mode continues for a certain time, and then the next mode of operation occurs. If this is done, there will usually be agreement between the parties as to which mode will be used for communication for any given period. However, it is also possible for the mode to be switched continually throughout the course of the measurement between the first and second modes of operation. The parties can then post select the events from the different operation modes to distil the key.

The communication system may contain more than two transmitters; here n is an integer of at least 3, the system being adapted to select a pair of transmitters from said n transmitters in the first mode of operation. It is possible in this arrangement for the system to switch between the selection of the pairs of transmitters in the same way that the system switches between MDI-QKD and QKD.

To distil the key in MDI-QKD, a second communication channel is provided between the two transmitters and the receiver and between the two transmitters. The second channel is a classical channel which does not have to be secure or capable of supporting quantum communication. The receiver may be adapted to communicate over the second channel the results of his measurements where a detection event was registered in two detectors which use the same measurement basis, if the first sensor uses a different measurement basis to the second sensor, then the Bell state measurement will occur when two detectors in the same sensor register a detection event, if both sensors use the same measurement basis, then a Bell state measurement will occur when a detection event is registered in each sensor (this will be described in more detail below). The transmitters are then adapted to communicate the measurement basis they used over the second channel when a detection event was registered in the first and second sensors. In one example, the receiver is adapted to communicate over the second channel the results of his measurements when a Bell state measurement was successfully performed.

For QKD, a second communication channel, which is a classical channel, is provided between the transmitter that was selected to send the pulse and the receiver.

The above described system can provide a quantum network between three or more nodes, wherein one node comprises the receiver and the other nodes each comprise one of the n transmitters.

Polarisation encoding may be used, such that the encoder is adapted to encode the light pulse using polarisation and the interference element comprises a beam splitter. Although other encoding methods can be used, for example phase encoding.

For polarisation encoding, in an example, there is a rotation of 45 degrees between the first and second measurement bases.

For phase encoding, the encoder is adapted to encode the light pulse using phase in an example, there is a rotation of 90 degrees between the first and second measurement bases and the interference element comprises a beam splitter.

The system may further comprise a polarisation rotator, being adapted to vary the measurement basis of at least one of the sensors. This allows efficient stabilisation of the MDI-QKD arrangement.

When using an MDI-QKD system where both the first and second sensors use the same measurement basis, it can take some time to collect the relevant data for the users to balance the system, i.e. the sending and receiving the data across different combination of bases. However, when it is possible to use a system where the polarisation basis can be varied in the receiver, the relevant data can be collected more efficiently if the transmitters and the receiver discuss the basis to be used during calibration.

In a further embodiment, a receiver for a communication system is provided, the receiver comprising a first element capable of causing interference between two light pulses that arrive at the interference element at the same time, the receiver further comprising first and second sensors, said sensors being provided such that light pulses are directed from the first element into the sensors, the sensors each comprising a decoder capable of making a measurement of a light pulse using a measurement basis, wherein the first sensor has a first measurement basis and the second sensor has a second measurement basis which is different to the first measurement basis, the receiver being configured such that the measurement basis of the first and second sensors are fixed for a sequence of pulses received at the receiver.

In the above receiver QKD and MDI-QKD can be used without the need to actively switch the measurement basis. The interference element will randomly direct a pulse to either the first sensor or the second sensor during QKD and this causes the random selection of the measurement basis.

The above receiver may be configured to store results for distilling a key via MDI-QKD by storing the time and which detectors registered a detection event when two detection events occurred at the same time in detectors measuring using the same measurement basis. The receiver also being configured to store results for distilling a key via QKD by storing the time and which detector registered a detection event when a single detection event occurred at a same time.

In further embodiments the receiver may be configured differently to above and the measurement basis may be varied for one sensor over time, in this arrangement it is possible to execute MDI-QKD switching between both sensors measuring using the same basis and the sensors measuring using different basis. When the sensors are set to the same measurement basis, any measurements made using QKD will need to be discarded.

In a further embodiment, a transmitter for a communication system is provided, the transmitter comprising a light source and an encoder such that the transmitter is adapted to output a stream of encoded pulses of light, the transmitter comprising a Suppressing Element adapted to be controlled to block the output of the transmitter for some of the pulses, the transmitter further comprising a controller adapted to store information concerning when the output of the transmitter was blocked and output this information.

In a further embodiment, a communication method is provided comprising:
providing a first transmitter adapted to prepare an encoded light pulse,
providing a second transmitter adapted to prepare an encoded light pulse,
wherein the light pulses are encoded in one of two states define in one of two measurement basis, the measurement basis being selected such that a measurement of the light pulse in the correct measurement basis will yield an accurate result and a measurement in the other basis will yield an inaccurate result;
switching between outputting pulses from both transmitters, or selecting output from one of the transmitters; and
receiving said light pulses at a receiver and decoding the encoded light pulses, wherein light pulses that have been received from both transmitters are interfered at an interference element and directed to first and/or second sensors wherein the first sensor uses the one measurement basis and the second sensors use the other measurement basis.

Here, continual switching between outputting pulses from both transmitters, or selecting output from one of the transmitters may be performed, the method further comprising deriving a key from the decoded pulses by post selecting events. A first communication protocol may be is implemented to distil a cryptographic key between the two transmitters and a second protocol may be used to distil a cryptographic key between one of the transmitters and the receiver.

FIG. 1 is a schematic of a communication system that is suitable for quantum communication. The system comprises a first transmitter 1 and a second transmitter 3. The system comprises a receiver 5. It will become apparent as the description progresses that the roles of the transmitter and receiver are, in some cases, interchangeable. However, for this start of the description, they will assume the roles of transmitter and receiver.

Transmitter 1 and transmitter 3 each comprise a light source 7, 9. The light source in one embodiment is a single-photon light source emitting single photons. This can be approximated using a pair of entangled photons and then measuring one photon in the pair ("heralded single-photon source"). In another embodiment, the light source is an attenuated laser emitting weak photon pulses, i.e., pulses whose intensity is less than one photon per pulse. If the intensity of the emitted pulses is modulated, e.g. with an intensity modulator that follows the laser source, a higher key rate can be obtained through the so-called "decoy-state technique".

The transmitters 1 and 3 will also comprise an encoder. In FIG. 1, the encoders are not shown. The encoder in both cases is configured to prepare photons where single photons are encoded using polarization, phase etc. For this example, it will be presumed that the polarization encoding is used. However, further examples will be discussed later using other types of quantum encoding.

The encoder prepares the light pulses to have polarisations that are selected from horizontal H, Vertical V, Diagonal D and Anti-diagonal A. Polarisation states H and V form a rectilinear basis Z and polarisation states D and A form a diagonal basis X. The polarisation bases Z and X are examples of complementary observables. Complementary means that they are related by the Heisenberg uncertainty principle.

In the MDI-QKD Alice and Carl can encode their photons in any of these bases or states within these bases they never reveal what states have been used and they reveal the bases only after Bob has told them which of his detectors fired. They simultaneously transmit their photon pulses to the receiver 5.

The receiver 5 comprises, in this example, a beamsplitter 11. Beamsplitter 11 is 50:50 beamsplitter which divides the beam. Alice and Carl's photons arrive there at the same time and interfere with each other.

The beamsplitter directs one part of the beam to first sensor module 13 and the second part of the beam to second sensor module 15.

Both sensor modules have the same construction. The beam entering the sensor module impinges on polarizing beamsplitter and then directed towards the first detector or the second detector. The above described arrangement can be used for both MDI-QKD and standard QKD.

The detectors in the sensors 13, 15 are sensitive enough to register a detection event of a single photon. The detectors may be avalanche photodiodes (APDs).

Complementary observables are used in QKD. However, they do not need to be used in MDI-QKD.

In MDI-QKD, a so-called Bell measurement is performed, where the so-called Bell states are measured. As explained above, Alice and Carl, prepare their photons to have one of the polarisation states: H, V, D or A. Both chose their states independently and therefore both states can be different.

The photons interfere at 50:50 beamsplitter 11. In this example, the polarising beam splitter in each sensor is oriented to distinguish between horizontal and vertically polarised photons. Thus there is a horizontal polarisation detector (det-H) and a vertical polarisation detector (det-V) in each sensor.

A successful Bell state measurement occurs when two detectors (one in each sensor) measure orthogonal polarisations, i.e a detection event occurs in det-V of sensor 1 and det-H of sensor 2 or a detection event occurs in det-H of sensor 1 and det-V of sensor 2. This indicates a projection onto the Bell state of $|\psi^-\rangle = (1/\sqrt{2})(|HV\rangle - |Vh\rangle)$ or $|\psi^+\rangle = (1/\sqrt{2})(|HV\rangle + |VH\rangle)$.

Either after all of the pulses have been sent or after each pulse/group of pulses have been sent, Bob announces when he has made a successful Bell state measurement and the result (i.e. which detectors registered a count). This announcement can be made over a public channel as it does not give away any information about the key.

Alice and Carl then compare information over a public channel to determine whether or not they used the same basis. The keep the results from events where they used the same basis and they ignore the results where they did not use the same basis (i.e. either H,V or D,A).

From this, Alice and Carl can distil a secret key. Bob does not have enough information to determine the key as although he will know when a successful Bell state measurement was made and he may know from the communication between Alice and Carl, the measurement basis used when the Bell state was measured, he will not know initial state prepared in that basis by Alice or Carl.

MDI-QKD can also be implemented using a further arrangement using complementary observables; here one sensor will measure using the X basis and the other sensor using the Z basis. A Bell state measurement occurs when two detectors using the same measurement basis (i.e. within the same sensor) register detection events at the same time.

However, if one of the users i.e. Alice or Carl blocks their output so that just one of the users is sending a signal to the receiver, it is possible to implement standard QKD between the transmitter 1, 3 and the receiver 5.

Figures 2, 3:
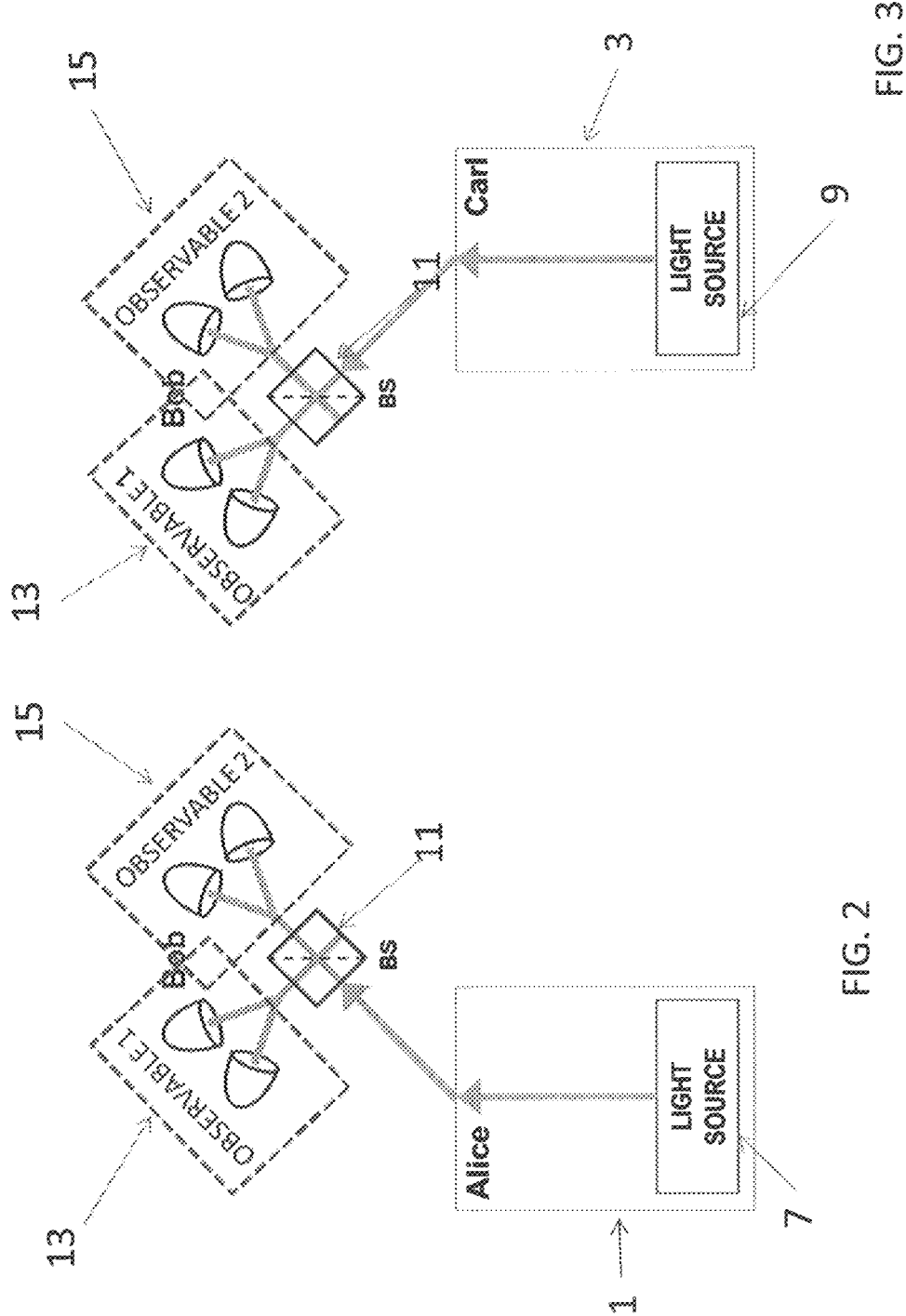
FIG. 2 is a schematic showing the components of the system of FIG. 1 that can be used to perform QKD between Alice and Bob.
FIG. 3 is a schematic showing the components of the system of FIG. 1 that can be used to perform QKD between Carl and Bob.

By blocking the output of one of the transmitters, it is possible for Alice to communication with the receiver as shown in FIG. 2 or for just Carl to communicate with the receiver as shown in FIG. 3. In such an arrangement, interference is avoided and essentially the two users, Alice and Carl are not correlated anymore and they can be seen as independent units.

This is a standard QKD setup and can run with any of the standard QKD protocols. In one example, the standard BB84 protocol is used, here, the sender (either Alice or Carl) prepare their photons to have one of the polarisation states: H, V, D or A. The receiver, Bob then measures the received photons changing his measurement basis so that Bob measures each pulse using either the X basis or the Z basis. Bob makes a measurement of the complementary observables encoded in the X and Z bases. If he measures using the wrong basis, he should still register a count in one of the two detectors of the sensor that receives the photon pulse. However, which detector registers an event is random if the wrong basis is used for the measurement. The basis is selected by switching a component, for example a polarising a beam splitter that directs the pulse into one of the two detectors of the sensor. The polarising beam splitter in the Z basis can distinguish between H and V polarisation and in the X basis between D and A polarisation. The measurement basis can be changed in practice by providing a polarisation rotator before the polarising beam splitter.

The sender and Bob can then communicate over a classical channel to determine when the measurement basis (i.e. X or Z) and the sending basis (i.e. X or Z) were the same. They keep these results.

Figure 4:
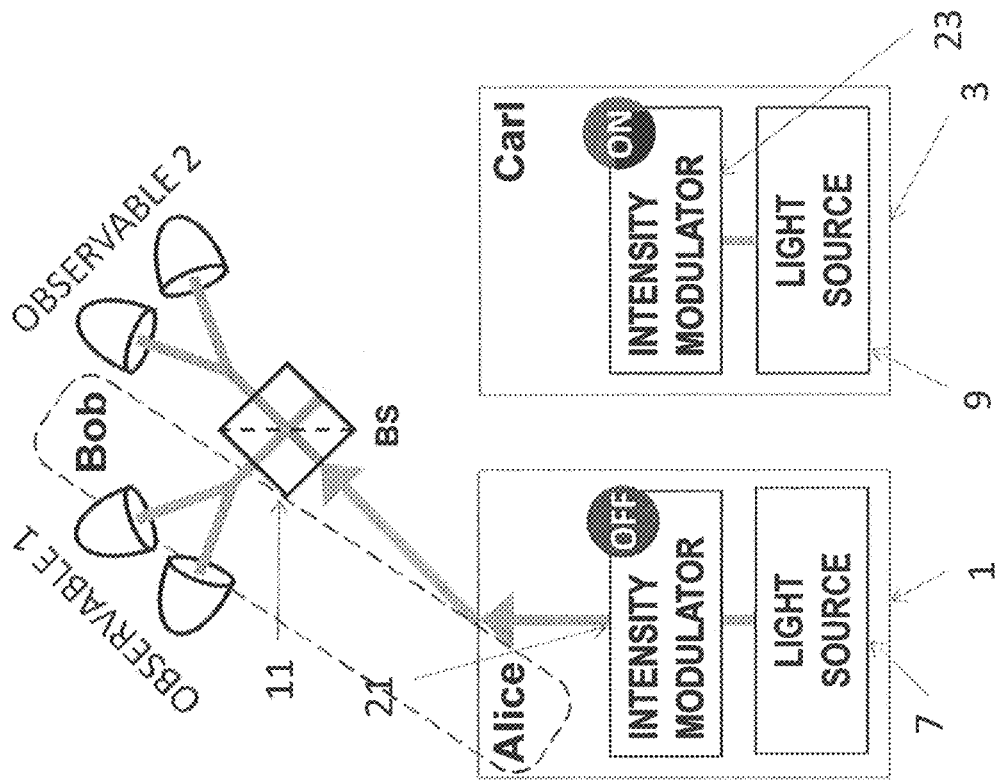
FIG. 4 is a schematic of a communication system in accordance with an embodiment of the present invention configured to implement both QKD and MDI-QKD; configured for QKD between Carl and Bob.

FIG. 4 shows a quantum communication system in accordance with an embodiment of the invention. Here, an intensity modulator 21 is provided in transmitter 1 and an intensity modulator 23 is provided in transmitter 3. The receiver remains the same as shown before.

In FIG. 4 Alice 1 intensity modulator 21 is on. This suppresses the output of light source X and thus no weak light pulses are outputted to the receiver 5.

As an alternative to the intensity modulator, it is possible to switch on and off the light sources. Carl's transmitter 3 has also intensity modulator 23. However, this intensity modulator is switched off. Therefore, pulses from Carl's transmitter 3 light source X are directed towards the receiver 5. Here, it is possible for Carl 3 and Bob 5 to perform QKD in order to establish a key.

Figure 5:
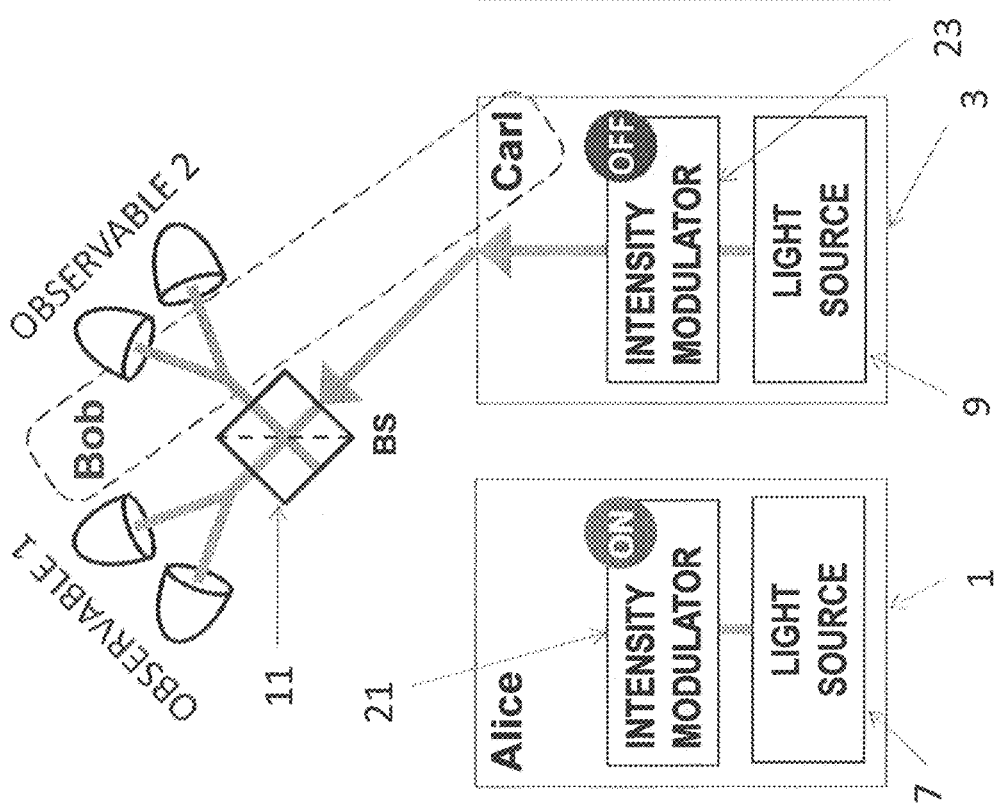
FIG. 5 is a schematic of a communication system in accordance with an embodiment of the present invention configured to implement both QKD and MDI-QKD; configured for QKD between Alice and Bob.

FIG. 5 depicts a reverse situation where Carl 3 has turned on his intensity modulator 23 and this blocks the output from his light source.

Alice 1 on the other hand has now switched off her intensity modulator 21 and this allows her light source X to send pulses via her encoder to the receiver 5. Thus Alice and Bob can determine a key using one of the known QKD protocols.

In FIG. 6(a), Alice 1 intensity modulator 21 is turned off and Carl's intensity modulator 23 is switched off. This means that when both Alice and Carl send light pulses at the same time, they pass through their intensity modulators, 21 and 23 and interfere at the beamsplitter 11 in Bob's receiver 5.

This allows exchange of a key between Alice and Carl using MDI-QKD as explained above. Therefore by switching intensity modulators 21 and 23 on and off as required, it is possible to change the functionality of the system between a QKD system and an MDI-QDK system.

Figure 6B:
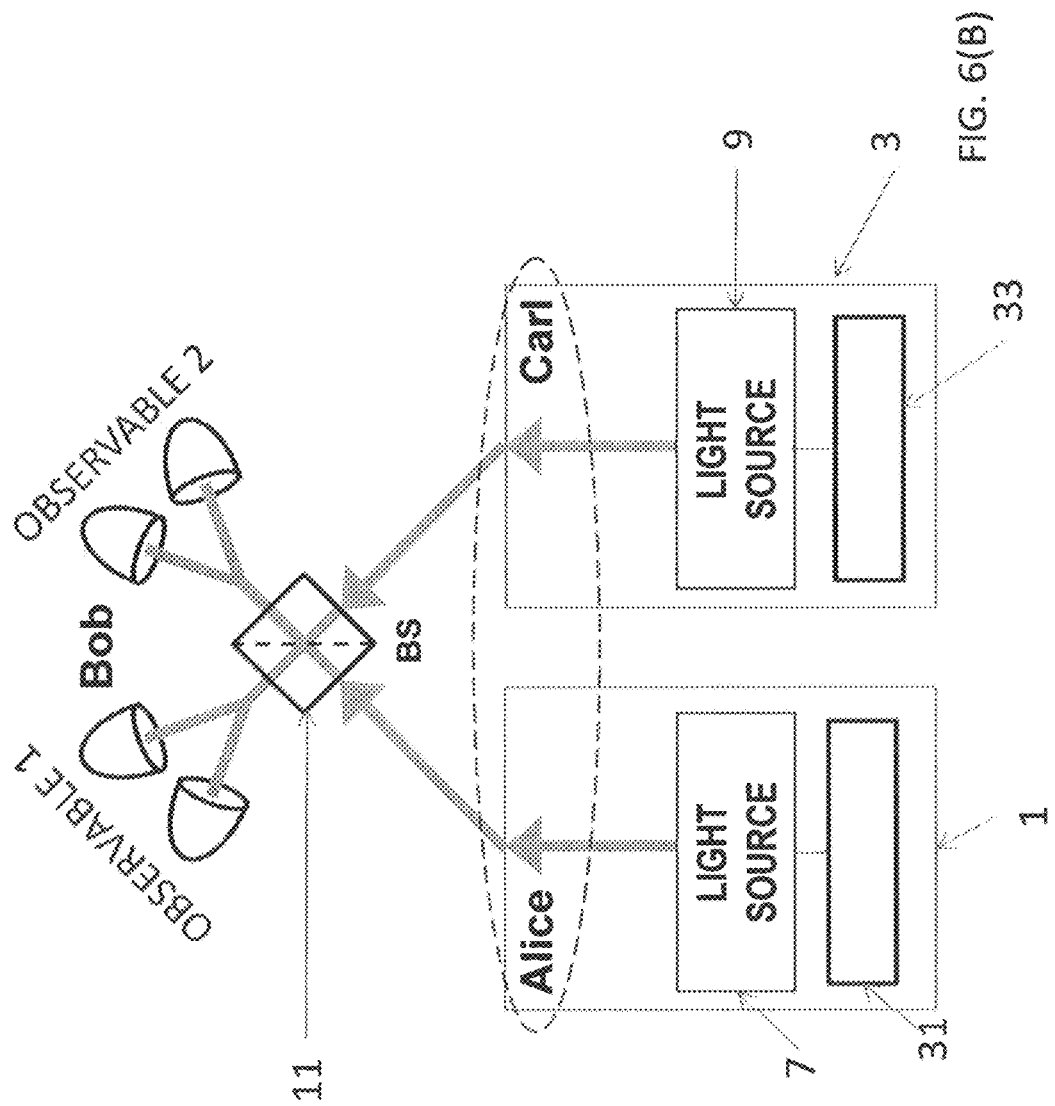
FIG. 6(B) is a variation on the system of FIG. 6(A) with a different type of suppressing element.

In FIG. 6(b) a variation on the system of FIG. 6(a) is shown. The system of FIG. 6(b) does not have intensity modulators 21 and 23. Instead, blocking circuit 31 is provided in transmitter 1 and blocking circuit 33 is provided in transmitter 3. The blocking circuits 1 and 3 are both connected to light sources 7 and 9 respectively and are adapted to switch off their respective light source to stop light exiting the transmitter.

Figure 7:
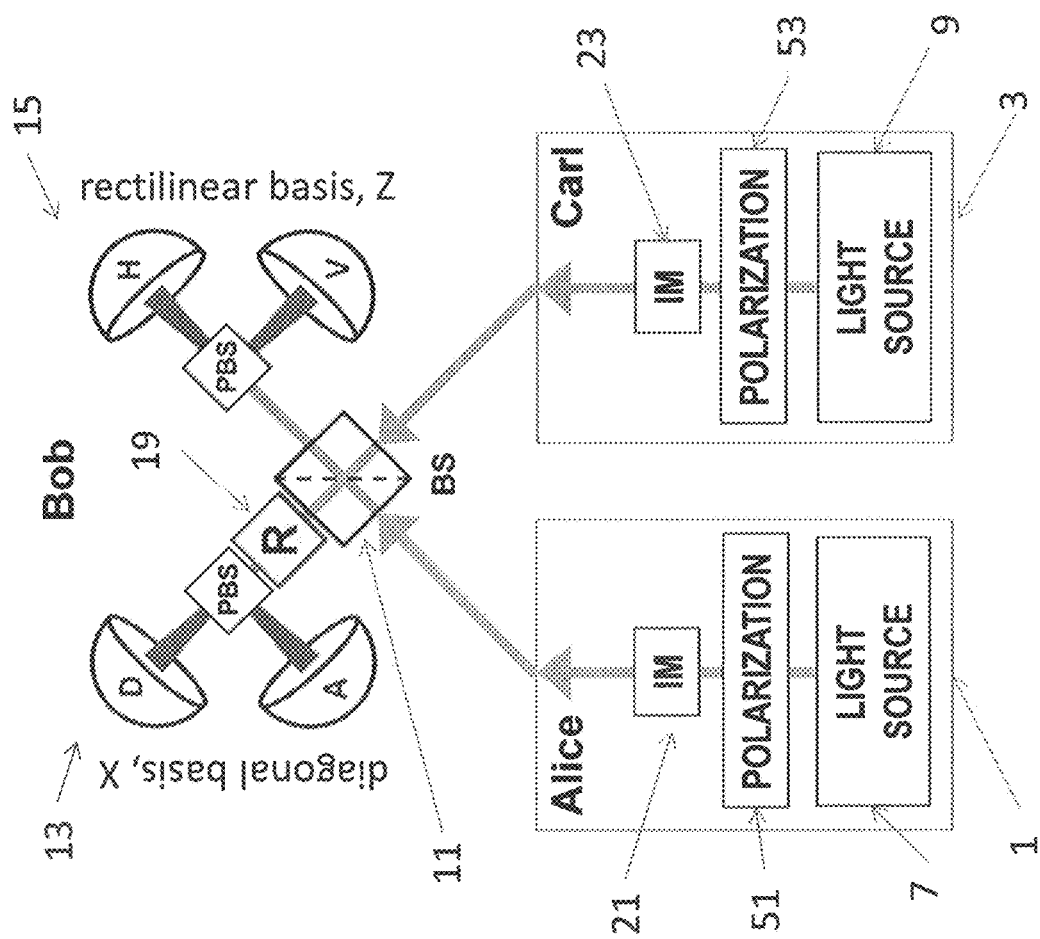
FIG. 7 is a schematic of a communication system in accordance with an embodiment of the present invention configured to implement both QKD and MDI-QKD using polarisation encoding.

FIG. 7 shows a further variation on the embodiment previously described. To avoid any unnecessary repetition, like reference numerals will be used to denote like features.

In Alice's transmitter 1, encoding is performed via polarizer 51, whereas in Carl's transmitter 3, encoding is performed by polarizer 53. When both intensity modulators 21 and 23 are switched off, the system can perform MDI-QKD as the signal from Alice 1 and from Carl 3 interfere at beamsplitter Y.

The signal is then split between first sensor 13 and second sensor 15.

Before entering first sensor 13, the signal passes through polarization rotator R. The polarization rotator R 19 in this example can change the measurement basis between Z (where the detectors detect horizontal and vertical polarization) and X (where the detectors detect diagonal and anti-diagonal polarization. When Bob has his rotator 101 set so that sensor X measures in diagonal basis X and in this example, sensor 2 is set to measure in a rectilinear basis Z, it is possible for Bob to perform a measurement of complementary observables and thus perform QKD. The rotator 19 can also be used to balance the system to adapt for polarisation drift.

When Bob has the rotator 101 set so that both sensor 1 and sensor 2 measure in rectilinear basis Z, then it is possible for the system to implement MDI-QKD using non-complementary variables.

Here, the pulses prepared by Alice and Carl interfere at the central beamsplitter X. When Bob has registered detection events in both sensors (also called "coincidence count") from detectors H/V or D/A that count is used to generate one bit of the quantum key and MDI-QKD. A coincidence count "H/V" occurs when two detectors H and V in different sensor modules register a detection event in a given time slot. On the contrary, a "single count" is when only one detector of the four registers a detection event.

However, when both Alice and Carl have their intensity modulators set to allow output from the transmitters; it is still possible to implement MDI-QKD while both sensors use complementary measurement bases.

Here, there is a Bell State measurement, and hence a coincidence count occurs when two detectors measuring using the same basis register detection events. For this situation to occur, both detectors would need to be in the same sensor.

Coincidence counts are much fewer than single counts because the probability that two detectors simultaneously click is much smaller than the probability that a single detector clicks.

In addition to being able to switch the system between sensor 1 measuring the X basis or the Z basis, rotator R also serves to allow measurement of single counts in basis X or basis Z. From the single counts, it is possible for the receiver Bob to give feedback to Alice and Carl who can use it to align (or keep aligned) their polarization controllers. Without the rotator R, the alignment would be much more problematic as it would need to rely on coincidence counts which are much fewer than single counts.

This has advantages for the MDI-QKD experiment with full modulation because it keeps the system automatically aligned.

Figure 8:
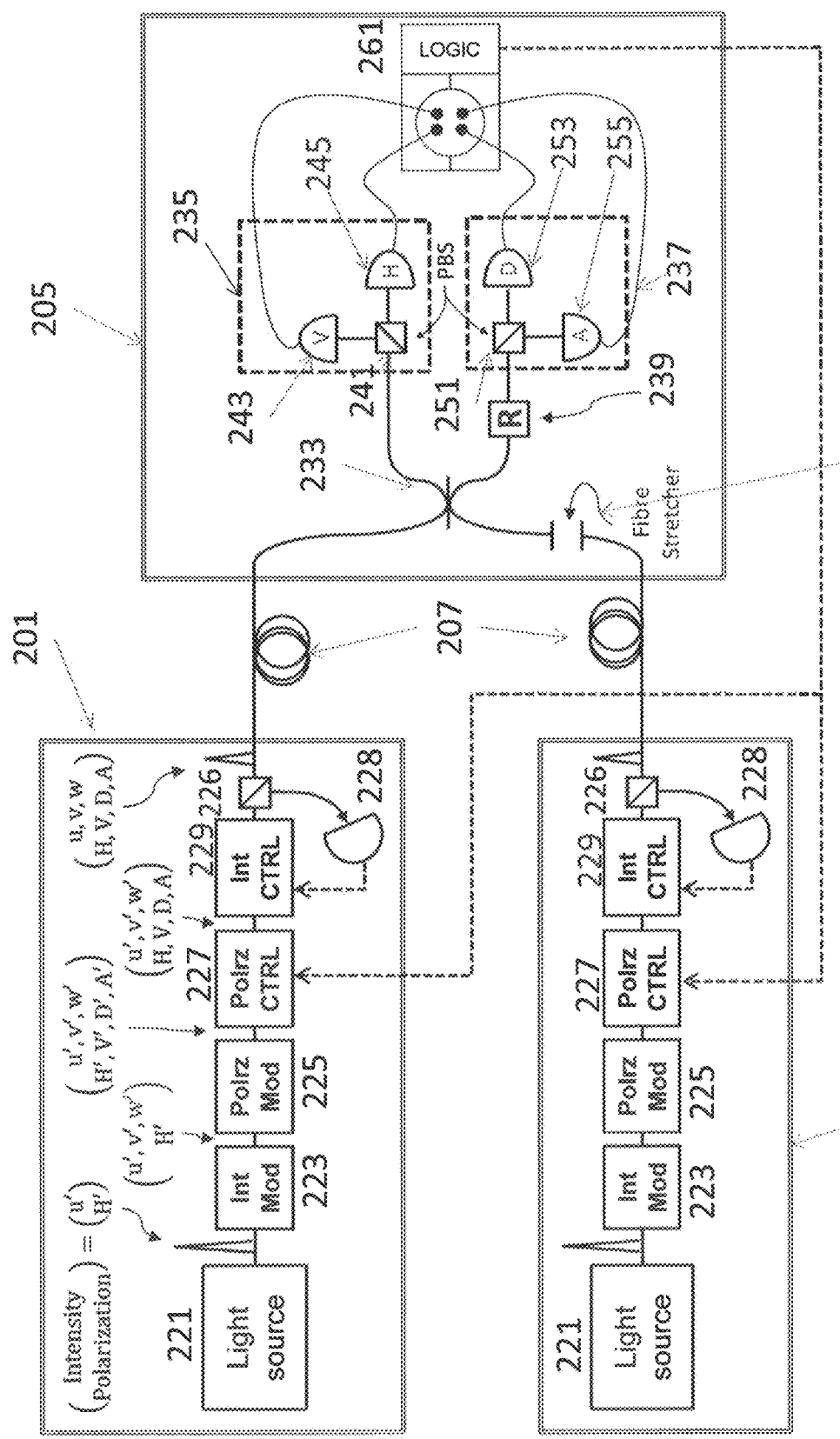
FIG. 8 is a detailed schematic of a fibre based communication system in accordance with an embodiment of the present invention configured to implement both QKD and MDI-QKD using polarisation encoding.

FIG. 8 shows in detail a fibre based implementation of the system explained with reference to FIG. 7 which relates to polarization encoding. In view of the extra components taught here, different numerals will be used.

As before, there is a transmitter (Alice) 201 and second transmitter (Carl) 203 and a receiver (Bob) 205.

In Alice's transmitter A, there is a light source 221 which is configured similar to the earlier described light sources, it can be a single photon source or an attenuated laser, etc.

The light source 221 outputs photon pulses having a polarization H' and with an intensity u'. Next, the output from the light source is passed through intensity modulator 223. Intensity modulator 223 is connected, in this example to the light source via a fibre. However, this system would also work as free space system.

In this example, the intensity modulator 223 has two functions. In its first function, it modulates the intensity of some of the pulses so that pulses are produced with either an intensity u', v' or w', this allows the use of a decoy state protocol. The decoy state protocol allows the error rate to be carefully monitored and can be used to determine the presence of eavesdroppers. Decoy state protocols are outside the scope of this application and will not be discussed further here. In its second function, it blocks the output from the light source 221 so no light exits the transmitter, thus the intensity modulator 223 also performs the function of the intensity modulator 21 of FIGS. 4 to 7.

This intensity modulator 223 is used both as part of a QKD protocol and also as an MDI-QKD protocol.

Next, the output from the intensity modulator 223 is passed into polarization modulator 225. Polarization modulator 225 is configured to output polarization in one of four possible states, H', V', D' or A'. Thus, it can output two states in the rectilinear basis (i.e. H', V') or two orthogonal states in the diagonal basis (D', A'). Next, the output of the polarization modulator 225 is fed into polarization controller 227.

The polarization controller 227 takes the output of the polarization modulator and applies if necessary, a further rotation. The polarization control 227 is there to correct polarization drift and receives feedback from the logic circuit which will be described with reference to the receiver.

The polarization controller 227 outputs the same states as the input states, but where necessary, the polarization rotation may be slightly adjusted to correct for drift.

The output of the polarization control 227 is then fed via a fibre into the intensity controller 229. In practice a (slowly) variable attenuator, that fine-tunes the average intensity emitted into the quantum channel. This is different to the intensity modulator 223 which is as fast as the clock rate of the system, so to be able to block a certain user in one single run and the unblock it, if necessary, in the following run.

The transmitter of Carl 203 is configured in exactly the same manner as the transmitter of Alice 201 and the components therein are denoted by the same reference numerals and a separate explanation will not be given.

Although the components are configured to be the same, the intensity modulator and/or the polarization modulator may prepare different quantum states. The polarization modulator 201 in Alice and Carl 203 will not be aware of the polarization modulator 225 in the other transmitter and therefore these modulators will be preparing different states.

The signals are transmitted through a fibre link to relay station 205. Relay station 205 is the same as the receiver previously discussed. Depending on how it is used, it can be thought of as either a relay station or a receiver.

The output from Alice's transmitter 201 and the output from Carl's transmitter 203 are sent over optical fibre links 207.

In one of the fibre links in this particular example, a fibre stretcher 231 is provided. The fibre stretcher 231 is tuneable so that the optical delay introduced by the fibre link from Alice's transmitter 201 is the same as the optical delay of the fibre link introduced by Carl's transmitter 203. Thus, in MDI-QKD when both Alice and Carl emit a pulse, the two signals arrive at the beamsplitter 233 at the same time and thus interfere with each other.

As explained with reference to the earlier figures, the beamsplitter 233 divides the beam between the first sensor 235 and the second sensor 237. Before the second sensor 237, a rotator 239 is provided. The rotator 239 allows the rotation of the polarization to be switched from being rectilinear to diagonal and vice versa. However, as explained above, in one embodiment, the system does not switch the measuring basis of one of the sensors and instead both sensors are set so that one sensor measures in the X basis and the other sensor in the Z basis. The beam splitter 233 will randomly direct single pulses to either the first sensor 235 or the second sensor 237, thus the measuring basis for QKD will be randomly changing.

In sensor 235, there is a polarizing beamsplitter 241. Polarizing beamsplitter 241 directs photons with a vertical polarization towards first detector 243 and photons with a horizontal polarization to second detector 245. Similarly, in the second sensor, the polarizing beamsplitter 251 is configured so that diagonally polarized photons are directed towards a third detector 253 and anti-diagonally polarized photons are directed towards fourth detector 255.

The output of each of the detectors 243, 245, 257 and 255 are connected to detector logic 261.

The above described system can switch between QKD and MDI QKD. In one embodiment, the parties decide beforehand whether communication will be via QKD or MDI QKD, in other embodiments, whether QKD or MDI-QKD is used is determined after communication by post selecting the results.

In the above embodiments, either MDI-QKD or QKD is used to distil the keys. They are not used simultaneously. When MDI-QKD is enabled, Bob cannot get any key and the key is obtained by Alice and Carl only. When QKD is enabled, Bob can distil a key with Alice if Carl's IM was ON or with Carl if Alice's IM was ON.

Everything can be done without knowing in the first place whether QKD or MDI-QKD was enabled. The parties simply encode and measure their states for a number of runs. Then they stop the quantum communication and go to the classical communication.

Bob speaks first and announces the runs in which he had "0" detectors firing, or "1" detector firing, or "2 or more" detectors firing. The parties discard all the runs in which a "0" was announced. Then they group the runs in which "1" was announced under "QKD" and the runs in which "2 or more" was announced under "MDI-QKD". Then Alice and Carl reveal the bases in the runs belonging to the MDI-QKD group. From these runs, Alice and Carl can distil a key, without Bob knowing that key. Then Alice and Bob reveal the bases in the runs belonging to the QKD group and discard the runs in which the bases were different. Then Carl reveals his settings for the IM for the remaining runs. With this information, Alice and Bob can distil a key without Carl knowing that key. The same can be done between Bob and Carl after knowing Alice's settings for the IM.

The system described with reference to FIG. 8 is a fibre based implementation of the scheme. In FIG. 8, the intensity modulators 223 are fast devices working in Gigahertz, while the controls 227 and 229 are slow and used for alignment based on the feedback signal. For the intensity, the feedback signal is given by a power meter 228 within the users boxes that measures part of the output signal derived from beam splitter 226 and not accessible to Bob. For the polarization, the users rely on the public declaration of the detected counts made by Bob. So it is not a real signal sent by Bob to the users but rather broadcast information from Bob used by Alice and Carl to align their systems using polarisation controllers 227.

The previous embodiments have discussed the above setup for use with polarization. However, the system can be also used for phase encoding or any other type of encoding. For phase encoding, the polarization modulator is replaced with an interferometer. Similarly, the rotator of FIG. 8 can be replaced by varying the phase shift applied in the interferometer which will reside in the relay station.

The above systems can be used to realize a quantum network. FIG. 9 shows a basic quantum network using the systems described above. There is communication between Alice 201 and Carl 203, communication between Alice 201 and Bob 205 and also Carl 203 and Bob 205.

An application for banking can be realised where for example Alice pays with a cheque which he has signed with a quantum key. Carl receives the signed cheque and Bob is able to cash the signed cheque.

In a quantum network, all users, each sit in on one node of the network, share (different or equal) quantum keys, i.e. keys distilled using either QKD or MDI-QKD.

When all pairs of nodes in a quantum network share secret keys, it is possible to run what is called a quantum digital signals (QDS) protocol.

The simplest quantum network is with three nodes where we have a (Alice), b (Bob), and c (Carl), which are the same users as previously described. For the QDS protocol, each pair of users distils a different quantum key $K_{ac}, K_{ab}, K_{bc}$. When using multiple users, there is a question as to how is it possible to distribute quantum keys to all of the users of the quantum network. The easiest way to do this is to connect all the nodes via a QKD link. This is shown in FIGS. 10(A)-10(F) where the number of links required for a two user network in FIG. 10(A), a three user network in FIG. 10(B), a four user network in FIG. 10(C), a five user network in FIG. 10(D), a six user network in FIG. 10(E), and a seven user network in FIG. 10(F) are shown. These networks require N(N−1)/2 QKD links.

However, if MDI is used, it is possible to achieve the relevant key distribution properties using only N−1 links. For example, in the network shown on FIG. 9, the key $K_{ac}$ between Alice and Carl is distilled using MDI-QKD. Here, Bob sees a coincidence count from his detectors while $K_{ab}$, $K_{bc}$ are distilled using QKD when Alice and Carl prepare "vacuum" states. When Alice (Carl) prepares a "vacuum", Alice is blocked out of the communication and Bob and Carl (Bob and Alice) can perform QKD. The terminology "vacuum" roots in decoy-state QKD. It refers to a pulse emitted by Alice (or by Carl) that contains no photons (i.e. zero photons). So it is called vacuum because it is devoid of any light. In an embodiment, it is difficult to prepare a perfect vacuum with an intensity modulator, but a "vacuum" may be defined as any state that contains a very small number of photons, e.g. $<10^{-5}$ photons per pulse.

Figures 11, 12:
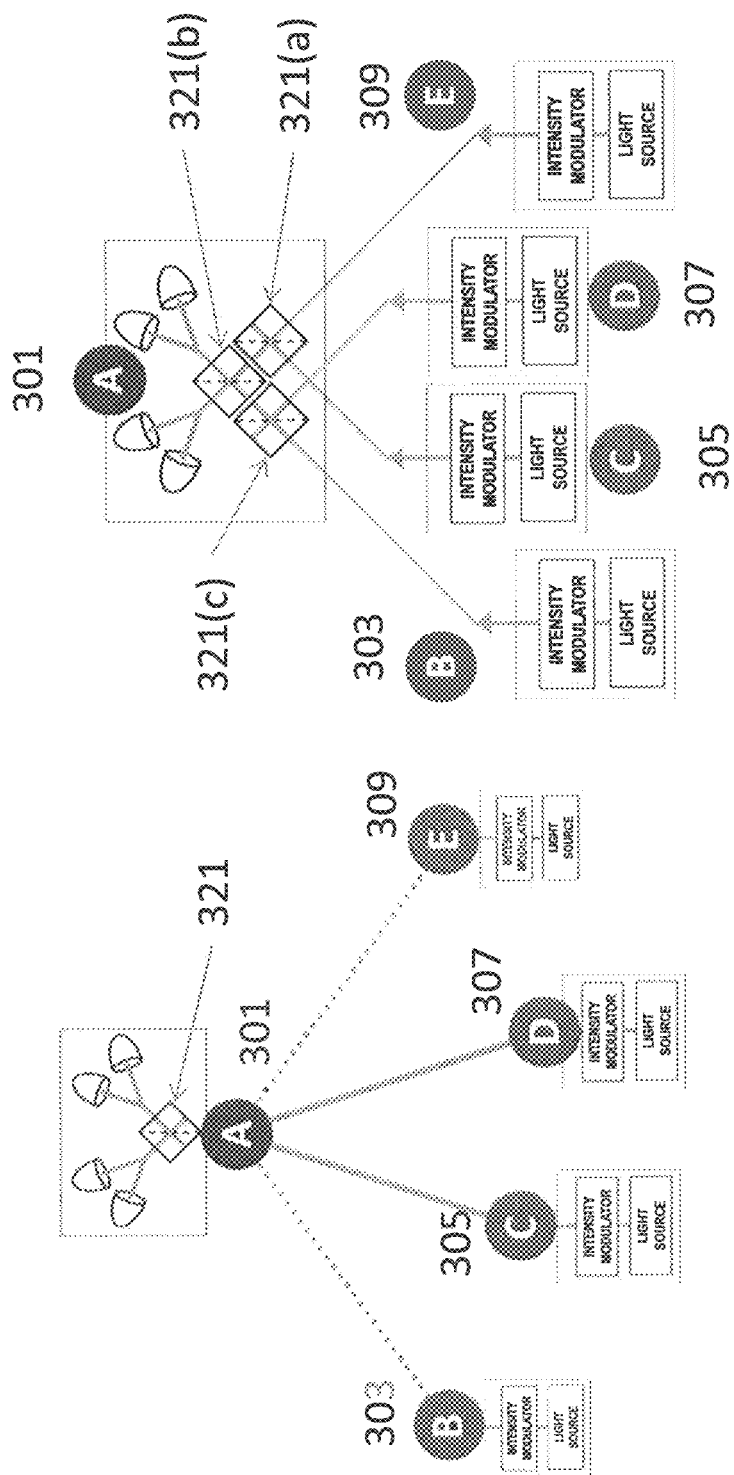
FIG. 11 is a schematic of a 5 node network implementing a combination of QKD and MDI-QKD.
FIG. 12 shows the interference elements of FIG. 11 in more detail.

For larger networks, for example for the type shown with reference to FIG. 11, the quantum network of FIG. 11 comprises five nodes. Each node is connected a central node, node A301 in this case. The central relay is connected to the outer nodes 303, 305, 307 and 309.

Each of the outer nodes 303, 305, 307, 309 can be connected via the central relay 301 in order to share key using an MDI-QKD protocol as previously described.

Each of the outer nodes, 303, 305, 307 and 309 can share a key with the central node 301 using the QKD protocol as described above.

FIG. 12 shows the network of FIG. 11 in more detail. Here, the relay 301 is shown with an arrangement of beamsplitters 321. Arrangement of beamsplitter 321 allows photons from each path to interfere at each beamsplitter. For example, the first beamsplitter 321(a) in beamsplitter arrangement 321 is configured to allow photons from node 309 and node 305 to interfere. The second beamsplitter 321(b) in the arrangement of beamsplitters is configured to allow interference between beamsplitter pulses prepared at node 303 and node 309. Beamsplitter 321(c) is provided so that it can allow interference of pulses between node 303 and node 307. The beam splitters 321(a), 321(b) and 321(c) are arranged so that it is possible to create interference between the output from any selected pair of transmitters. Some ports of some beam splitters 321(a), 321(b) and 321(c) are not used, whereas others are connected either to another beam splitter or to the detectors. The unused ports entail more losses in the system. In a further embodiment, additional detectors could be used to monitor also the output from those ports.

The timing system (not shown) then just had to synchronize the individual users so as to have them working in pairs.

In practice the beamsplitters could be arranged so that when a pair of transmitters are selected, the pulses from both transmitters travel an equal path length to the beam splitter where they interfere. Paths lengths along fibres can be adjusted using fibre stretchers.

The above networks that implement MDI-QKD and QKD are examples of combinations of trusted and untrusted node networks. If Bob is "trusted" (i.e. he cooperates with Alice and Carl) then QKD alone is sufficient to distil all the keys between the 3 parties using only 2 optical links, no MDI-QKD is needed.

If Bob is trusted, Alice and Bob could distil two keys Kab1 and Kab2. Then Bob and Carl could distil other two keys Kbc1 and Kbc2. Then Bob could perform the XOR of Kab2 and Kbc2 and publicly announce the result. From the announcement, Alice can reconstruct Kbc2 and Carl can reconstruct Kab2. In the end, all users own their keys. But the crucial difference is that in this case Bob knows the key shared by Alice and Carl. If he were evil, he could intercept all the communications between Alice and Carl and use them for his own purposes. With MDI-QKD, Bob doesn't know the key owned by Alice and Carl and he doesn't need to be "trusted". This is important because in reality the node connecting two or more users in a network could be owned by a third party.

The above embodiments provide many advantages, for example, they allow a set up for generating secure quantum keys at each node of a network using a QKD protocol or an MDI-QKD protocol as required. These keys can be used for quantum digital signatures (QDS) or for other quantum based communication protocols. Also efficient extension of QKD to networks is provided where the efficiency comes from the number of quantum links scaling linearly with the number of nodes.

The above embodiments provide a single set up for both QKD and MDI-QKD. The alignment and stabilisation of an MDI-QKD system is based on "coincidence counts" whereas the above embodiments can also use single counts which are more numerous and thus allow more effective control.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A communication system comprising n transmitters and a receiver, where n is an integer of at least 2, each of said n transmitters comprising a light source and an encoder such that each transmitter is adapted to output an encoded pulse of light, said receiver comprising a first element, the system further comprising a timing circuit, the timing circuit being configured to synchronise the encoded pulses output by the transmitters such that interference between a light pulse sent from the first transmitter and a light pulse from the second transmitter, interfere at the first element, each transmitter further comprising a suppressing element adapted to stop light exiting one of the transmitters such that the system is switchable between a first operation mode where two transmitters output encoded pulses and where both pulses interfere at the interference element and a second mode of operation where just one transmitter transmits light pulses to said receiver, the suppressing element being controlled to stop light exiting the other transmitter.

2. A communication system according to claim 1, wherein the receiver further comprises first and second sensors, said sensors being provided such that light pulses are directed from the first element into the sensors, the sensors comprising a decoder capable of making a measurement of a light pulse using a measurement basis, wherein the measurement basis used in the first sensor is different to the measurement basis used in the second sensor.

3. A communication system according to claim 1, wherein the receiver further comprises first and second sensors, said sensors being provided such that light pulses are directed from the first element into the sensors, the sensors comprising a decoder capable of making a measurement of a light pulse using a measurement basis, wherein the measurement basis used in the first sensor can be switched between being the same or different to the measurement basis used in the second sensor.

4. A communication system according to claim 1, adapted to be switched continually throughout a course of a measurement between the first and second modes of operation.

5. A communication system according to claim 1, wherein the n is an integer of at least 3, the system being adapted to select a pair of transmitters from said n transmitters in the first mode of operation.

6. A communication system, according to claim 1, wherein in the first mode of operation, a second communication channel is provided between the two transmitters and the receiver and between the two transmitters, the second channel being a classical communication channel.

7. A communication system according to claim 6, wherein in the first mode of operation the receiver is adapted to communicate over the second channel the results of measurements where two detection events were registered in the same measurement basis and the transmitters are adapted to communicate the measurement basis they used over the second channel when a detection event was registered in the first and second sensors.

8. A communication system according to claim 7, wherein in the first mode of operation, the receiver is adapted to communicate over the second channel the results of measurements when a Bell state measurement was successfully performed.

9. A communication system, according to claim 1, wherein in the second mode of operation, a second communication channel is provided between the transmitter that was selected to send the pulse and the receiver, the second communication channel being a classical communication channel.

10. A communication system according to claim 1, adapted to provide a quantum network between three or more nodes, wherein one node comprises the receiver and the other nodes each comprise one of the n transmitters.

11. A communication system according to claim 1, wherein the encoder is adapted to encode the light pulse using polarisation and the interference element comprises a beam splitter.

12. A communication system according to claim 11, wherein there is a rotation of 45 degrees between a first and a second measurement basis.

13. A communication system according to claim 1, the system further comprising a polarisation rotator, said polarisation rotator being adapted to change a measuring basis of one of the sensors.

14. A communication system according to claim 1, wherein the encoder is adapted to encode the light pulse using phase and the interference element comprises a beam splitter.

* * * * *